(12) United States Patent
Johnston et al.

(10) Patent No.: US 9,736,124 B2
(45) Date of Patent: *Aug. 15, 2017

(54) SYSTEM AND METHOD FOR SECURE TRANSMISSION OF MEDIA CONTENT

(71) Applicant: AT&T MOBILITY II LLC, Atlanta, GA (US)

(72) Inventors: Robert Johnston, Atlanta, GA (US); Frank Coppa, Kansas City, MO (US); James Wood, Gainesville, GA (US)

(73) Assignee: AT&T MOBILITY II LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/057,191

(22) Filed: Mar. 1, 2016

(65) Prior Publication Data

US 2016/0182468 A1 Jun. 23, 2016

Related U.S. Application Data

(63) Continuation of application No. 13/912,718, filed on Jun. 7, 2013, now Pat. No. 9,306,918, which is a
(Continued)

(51) Int. Cl.
*H04L 29/06* (2006.01)
*H04L 9/08* (2006.01)
(Continued)

(52) U.S. Cl.
CPC .......... *H04L 63/0471* (2013.01); *H04L 9/083* (2013.01); *H04L 9/088* (2013.01);
(Continued)

(58) Field of Classification Search
CPC ....... H04L 63/047; H04L 9/083; H04L 9/088; H04L 9/0891; H04L 9/0894; H04L 63/062; H04L 63/0428; H04N 7/17318; H04N 21/2347; H04N 21/2541; H04N 21/25875; H04N 21/26606; H04N 21/4122; H04N 21/4126; H04N 21/4181; H04N 21/4227;
(Continued)

(56) References Cited

U.S. PATENT DOCUMENTS

2007/0121940 A1 5/2007 Park et al.
2007/0250912 A1 10/2007 Rassool et al.
(Continued)

*Primary Examiner* — Michael S McNally
(74) *Attorney, Agent, or Firm* — Guntin & Gust, PLC; Jay H. Anderson

(57) ABSTRACT

A system that incorporates teachings of the present disclosure may include, for example, a gateway comprising a controller to receive from a communication device a request for media content, receive a key and a record associated with the communications device from an interactive television system, wherein the record comprises a list of entitled media content, determine whether the requested media content is in the list of entitled media content, retrieve the requested media content from the interactive television system when the requested media content is determined to be in the list of entitled media content, encrypt the retrieved media content utilizing the key, and transmit the encrypted media content to the communications device. Other embodiments are disclosed.

20 Claims, 6 Drawing Sheets

Related U.S. Application Data continuation of application No. 12/405,929, filed on Mar. 17, 2009, now Pat. No. 8,484,458.

(51) Int. Cl.

| | | |
|---|---|---|
| *H04N 7/173* | (2011.01) | |
| *H04N 21/254* | (2011.01) | |
| *H04N 21/41* | (2011.01) | |
| *H04N 21/4227* | (2011.01) | |
| *H04N 21/472* | (2011.01) | |
| *H04N 21/478* | (2011.01) | |
| *H04N 21/61* | (2011.01) | |
| *H04N 21/6334* | (2011.01) | |
| *H04N 21/81* | (2011.01) | |
| *H04N 21/8355* | (2011.01) | |
| *H04N 21/258* | (2011.01) | |
| *H04N 21/2347* | (2011.01) | |
| *H04N 21/266* | (2011.01) | |
| *H04N 21/418* | (2011.01) | |

(52) U.S. Cl.
CPC .......... *H04L 9/0891* (2013.01); *H04L 9/0894* (2013.01); *H04L 63/062* (2013.01); *H04N 7/17318* (2013.01); *H04N 21/2347* (2013.01); *H04N 21/2541* (2013.01); *H04N 21/25875* (2013.01); *H04N 21/26606* (2013.01); *H04N 21/4122* (2013.01); *H04N 21/4126* (2013.01); *H04N 21/4181* (2013.01); *H04N 21/4227* (2013.01); *H04N 21/478* (2013.01); *H04N 21/47202* (2013.01); *H04N 21/6187* (2013.01); *H04N 21/63345* (2013.01); *H04N 21/8106* (2013.01); *H04N 21/8355* (2013.01); *H04L 63/0428* (2013.01); *H04L 2209/60* (2013.01); *H04L 2209/80* (2013.01)

(58) Field of Classification Search
CPC .......... H04N 21/47202; H04N 21/478; H04N 21/6187; H04N 21/63345; H04N 21/8106; H04N 21/8355
USPC ........................................................ 713/153
See application file for complete search history.

(56) References Cited

U.S. PATENT DOCUMENTS

| | | |
|---|---|---|
| 2007/0286420 A1 | 12/2007 | MacLean et al. |
| 2008/0120675 A1 | 5/2008 | Morad et al. |
| 2008/0123844 A1* | 5/2008 | Sun .................... H04N 21/2541 380/200 |
| 2008/0180614 A1 | 7/2008 | Yoon |
| 2008/0244710 A1* | 10/2008 | Foti .................... H04L 63/0853 726/4 |
| 2008/0310408 A1 | 12/2008 | Thompson et al. |
| 2009/0013174 A1 | 1/2009 | Foti et al. |
| 2009/0193469 A1 | 7/2009 | Igarashi |
| 2009/0252329 A1* | 10/2009 | Casey .................... H04L 63/10 380/279 |
| 2010/0070639 A1 | 3/2010 | Hoggan |
| 2010/0100898 A1* | 4/2010 | Pfleging ............ H04N 7/17318 725/28 |

* cited by examiner

500

SYSTEM AND METHOD FOR SECURE TRANSMISSION OF MEDIA CONTENT

CROSS-REFERENCE TO RELATED APPLICATIONS

This application is a continuation of and claims priority to U.S. patent application Ser. No. 13/912,718, filed Jun. 7, 2013, which is a continuation of U.S. patent application Ser. No. 12/405,929, filed Mar. 17, 2009, which are incorporated herein by reference in their entirety.

FIELD OF THE DISCLOSURE

The present disclosure relates generally to security and media and more specifically to a system and method for secure transmission of media content.

BACKGROUND

At the present time, consumers can enjoy various forms of media traditionally reserved for televisions or movie theaters in mobile devices such as cellular phones. Consumers can receive and experience media content on their mobile devices by accessing content portals, Internet-based television or radio systems, and other media sources. The media supplied by the service providers through such systems can include audio, text, video, and/or still images. A common concern of service providers is in protecting these services from being accessed by unauthorized users, and in protecting media content from unauthorized distribution and duplication.

DETAILED DESCRIPTION

Figure 1:
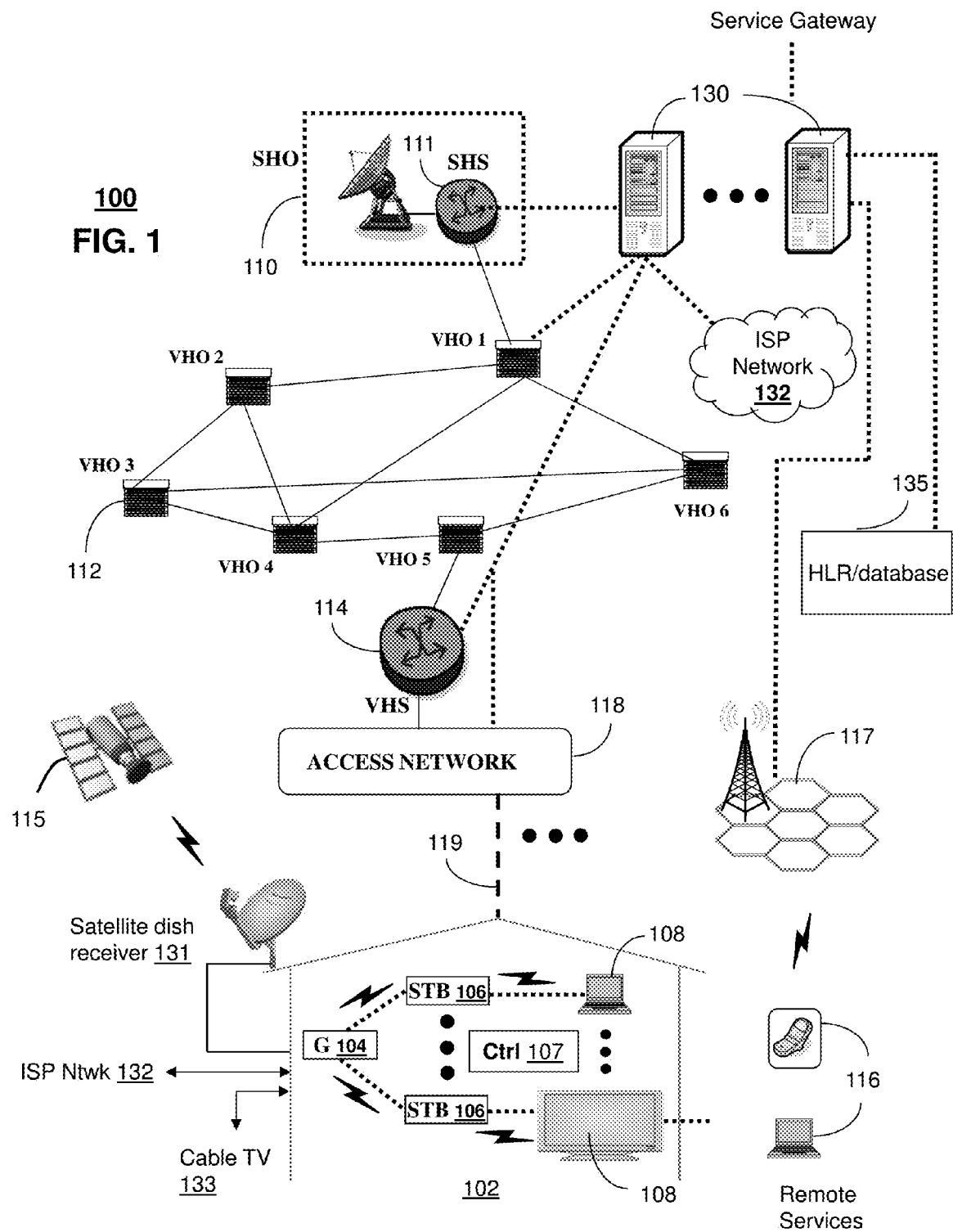
FIGS. 1-2 depict illustrative embodiments of communication systems that provide media services.

One embodiment of the present disclosure can entail a method including accessing an encryption key and a record stored in a Home Location Register (HLR) in response to receiving a request from a communications device for media content, wherein the record comprises a list of entitled media content, determining whether the requested media content is associated with at least one entry in the list of entitled media content, retrieving the requested media content when the requested media content is determined to be associated with the at least one entry in the list of entitled media content, encrypting the retrieved media content by utilizing the encryption key; and transmitting the encrypted media content to the communications device.

Another embodiment of the present disclosure can entail a gateway having a controller to receive from a communication device a request for media content, receive a key and a record associated with the communications device from an interactive Television (iTV) system, wherein the record comprises a list of entitled media content, determine whether the requested media content is in the list of entitled media content, retrieve the requested media content from the iTV system when the requested media content is determined to be in the list of entitled media content, encrypt the retrieved media content utilizing the key, and transmit the encrypted media content to the communications device.

Yet another embodiment of the present disclosure can entail a communications device having a controller to request media content from an iTV system, receive the requested media content from a gateway operably coupled to the communications device and the iTV system when the gateway determines that the requested media content is authorized, wherein the gateway encrypts the requested media content using an encryption key, and decrypt the received media content using a decryption key stored on the communications device.

Yet another embodiment of the present disclosure can entail a HLR comprising a controller to store a key and a record associated with a communications device, wherein the record comprises a list of entitled media content that the communications device is authorized to receive, and enable a gateway communicatively coupled to the communications device to access the key and the record when the communications device sends a request for media content, wherein the gateway compares the requested media content to the list of entitled media content, and wherein the gateway encrypts the media content by using the key and transmits the encrypted media content to the communications device when the media content is in the list of entitled media content.

Yet another embodiment of the present disclosure can entail a computer-readable storage medium comprising computer instructions to request media content from an interactive Television (iTV) system, receive the requested media content from the iTV system when the iTV system determines that the requested media content is in a list of entitled media content, wherein the iTV system encrypts the requested media content using an encryption key when the requested media content is in the list, and wherein the list of entitled media content and the encryption key are stored in a Home Location Register (HLR), and decrypt the received media content using a decryption key stored on the communications device.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

In an embodiment, the communication system 100 can also include a database/Home Location Register (HLR) 135. The database/HLR 135 can maintain, provide, and store routing information and detailed information about subscribers authorized to access the communications system 100. Notably, the HLR 135 can store biographic information pertaining to the subscriber, address data, information contained in Subscriber Identity Module (SIM) cards, information pertaining to the types of services the subscriber subscribes to, subscriber preferences, and the current location of the subscriber. The HLR 135 can also store encryption/decryption keys, records outlining the allocation of content or channels that a subscriber is entitled to, and other types of information and data. The records outlining the content that a subscriber is entitled to can arrange entries based on programming tiers and/or logical programming groups and can illustrate which content is accessible and/or viewable. The HLR 135 can be operably coupled to the computing devices 130 or other devices of the communications system 100. When a subscriber sends a request for content or attempts to access content, the HLR 135 can be accessed by the computing devices 130 or other devices in order to determine if the subscriber is entitled or authorized to access or receive the content.

Another distinct portion of the computing devices 130 can function as a gateway (herein referred to as gateway 130). The gateway 130 can use common computing and communication technology to perform the function of enabling a network to interface with another network. Notably, the gateway 130 can receive media content from the SHO 111 and can transmit the media content to remote devices 116 and to building 102 and to any devices contained therein via access network 118. Of course, the gateway 130 can perform the traditional functions of a gateway including, but not limited to, protocol translation/conversion, signal translation, rate conversion, and any other functions performed by gateways.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
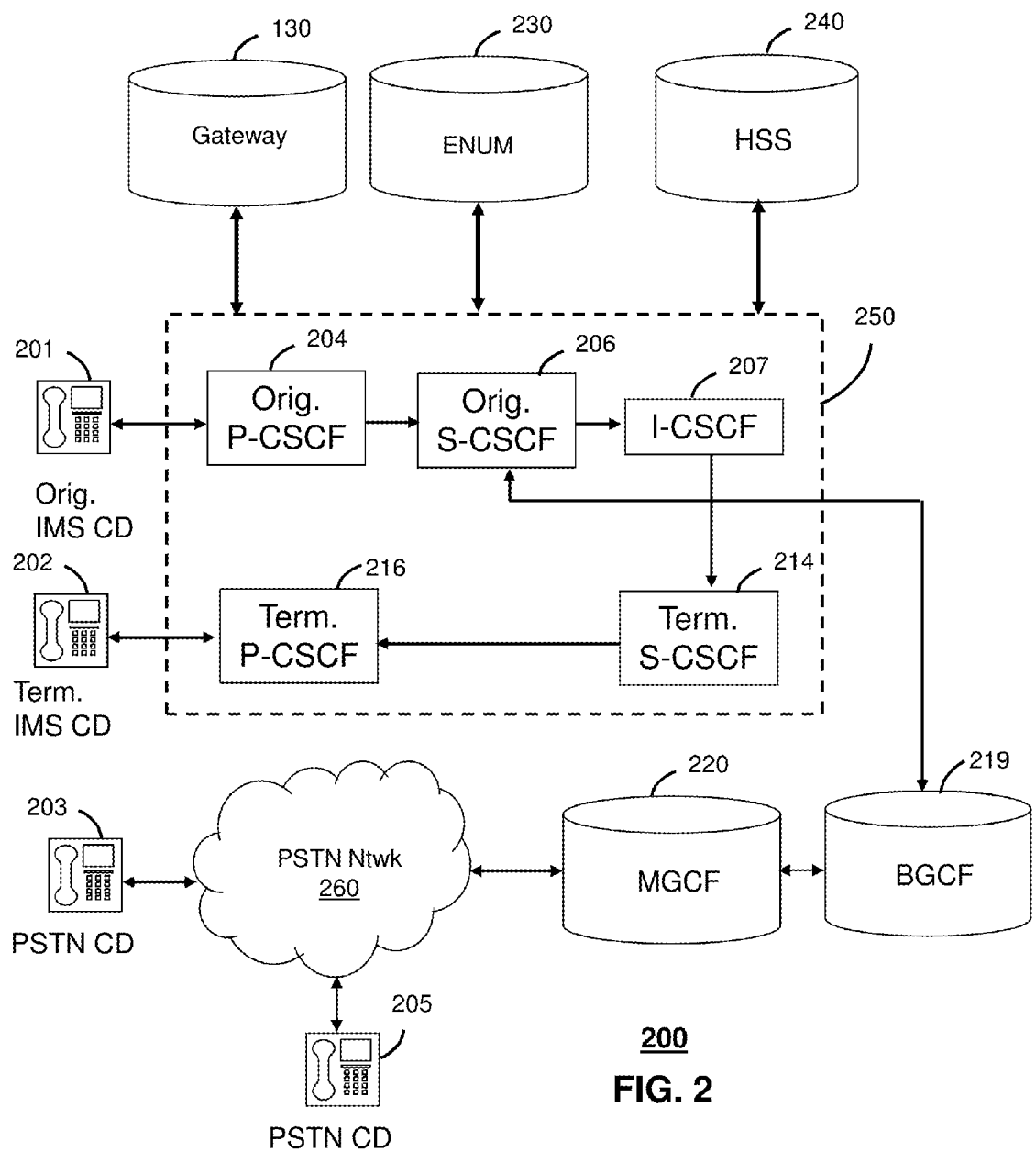

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

The gateway 130 of FIG. 1 can be operably coupled to the second communication system 200 for purposes similar to those described above.

Figure 3:
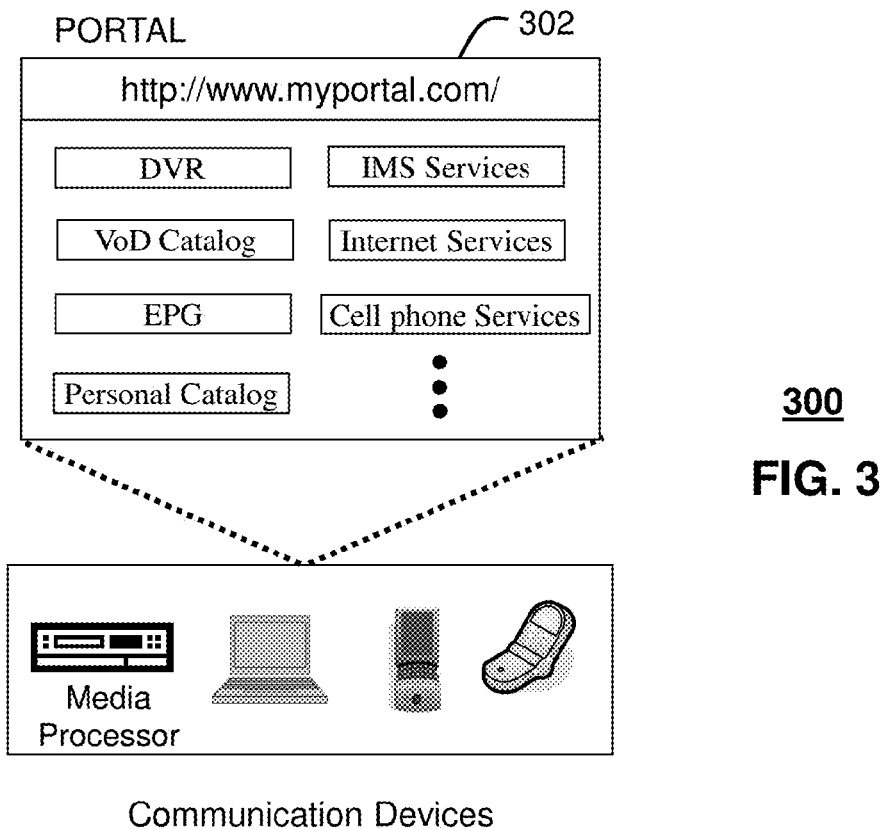
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 4:
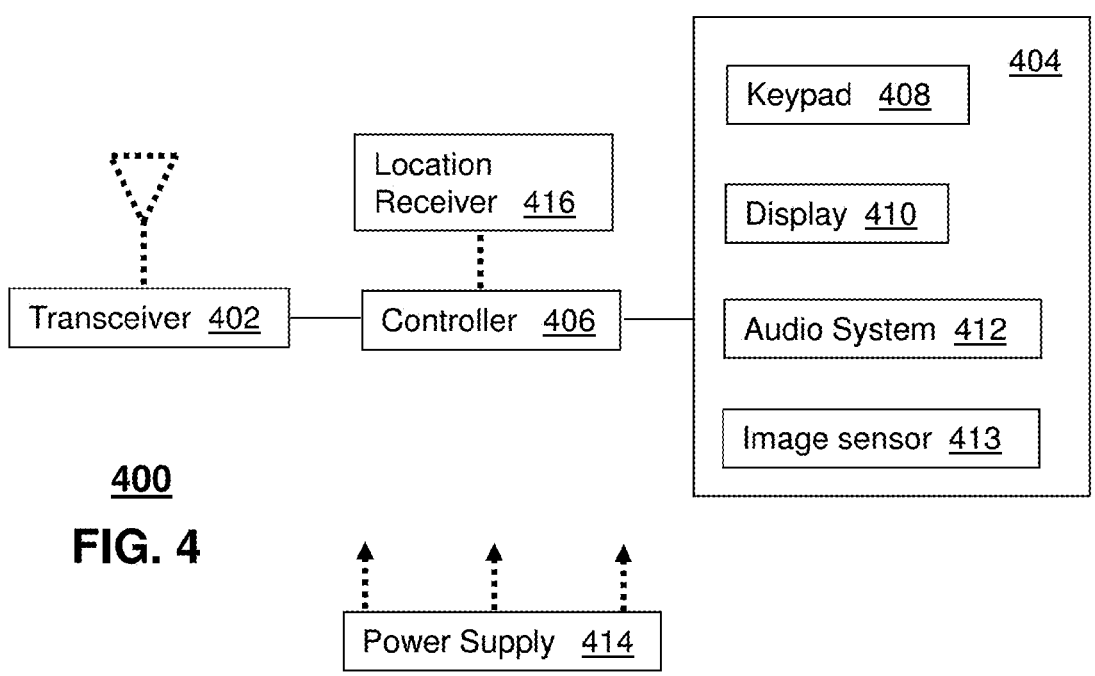
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VOID, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 400 based on signals generated by a constellation of GPS satellites, thereby facilitating common location services such as navigation.

The communication device 400 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
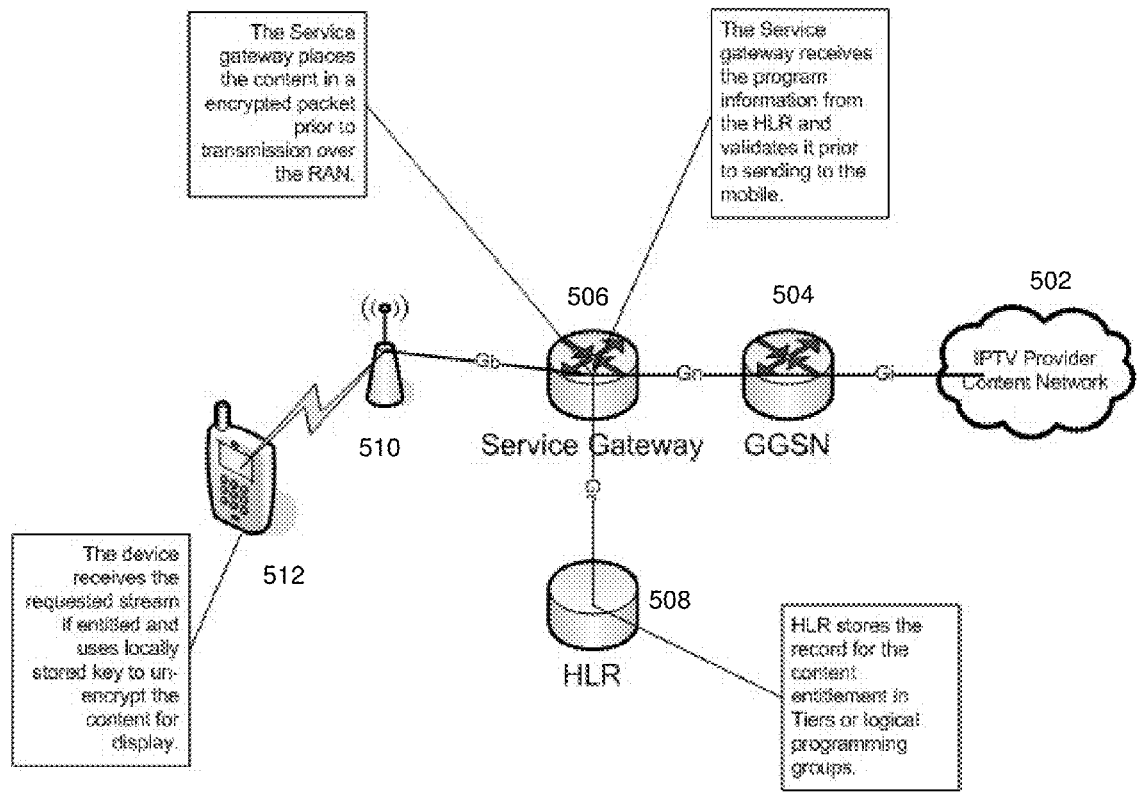
FIG. 5 depicts an illustrative embodiment of a system for providing secure transmission of media content, the system operating in portions of the communication systems of FIGS. 1-2.

FIG. 5 depicts an illustrative embodiment of a system 500 for providing secure transmission of media content, the system 500 being operable in portions of the communications systems of FIGS. 1-2. The system 500 can include an iTV system such as IPTV provider content system (IPTV system 502), a Gateway GPRS Support Node (GGSN) 504, a gateway 506, an HLR 508, a base station 510, and a communications device 512. Notably, the IPTV system 502 can be configured to deliver media content such as video, still images, audio, text, and other media content to the GGSN 504, which can serve as an interface between the IPTV system 502 and the other devices in the system 500. Also, the gateway 506 can have, but is not limited to having, the same functionality as gateway 130.

The HLR 508 can be identical and/or similar to HLR 135 and can store records routing information and information about subscribers authorized to access the system 500. Also, the HLR 508 can store subscriber profiles, information contained in Subscriber Identity Module (SIM) cards, the current location of the subscriber, encryption/decryption keys, records outlining content the subscriber is entitled to, and other types of information and data. Entries in the records can be grouped and/or based on programming tiers or logical programming groups, and the entries can illustrate which content is accessible and/or viewable for a particular subscriber. Content can be characterized as entitled if a subscriber subscribes to the content. Entitled content can be flagged as viewable based on the programming tiers. The communications device 512, which can be operably coupled to the base station 510, can include, for example, a mobile device, a cellular phone, set-top box, wireless device, personal digital assistant (PDA), computer, or other communications device.

The system 500 can enable a user/subscriber to send a request for media content to the IPTV system 502 via gateway 506 using communications device 512. The gateway 506 can access the HLR 508 in order to determine if the user is entitled or authorized to receive the requested media content. If the user has not subscribed to the media content or is not otherwise entitled to the media content, the gateway 506 can prevent transmission of the media content to the user. However, if the gateway 506 determines that the user is entitled to the content, the gateway 506 can receive the media content from the IPTV system 502 and encrypt the media content using an encryption key. The encryption key can be stored on the HLR 508 and can be accessed and/or retrieved by the gateway 506. The encrypted media content can then be transmitted by the gateway 506 to the base station 510 for transmission to the communications device 512. Once the communications device 512 receives the encrypted media content, the media content can be decrypted by the communications device 512 using a decryption key and the user can experience the media content.

Figure 6:
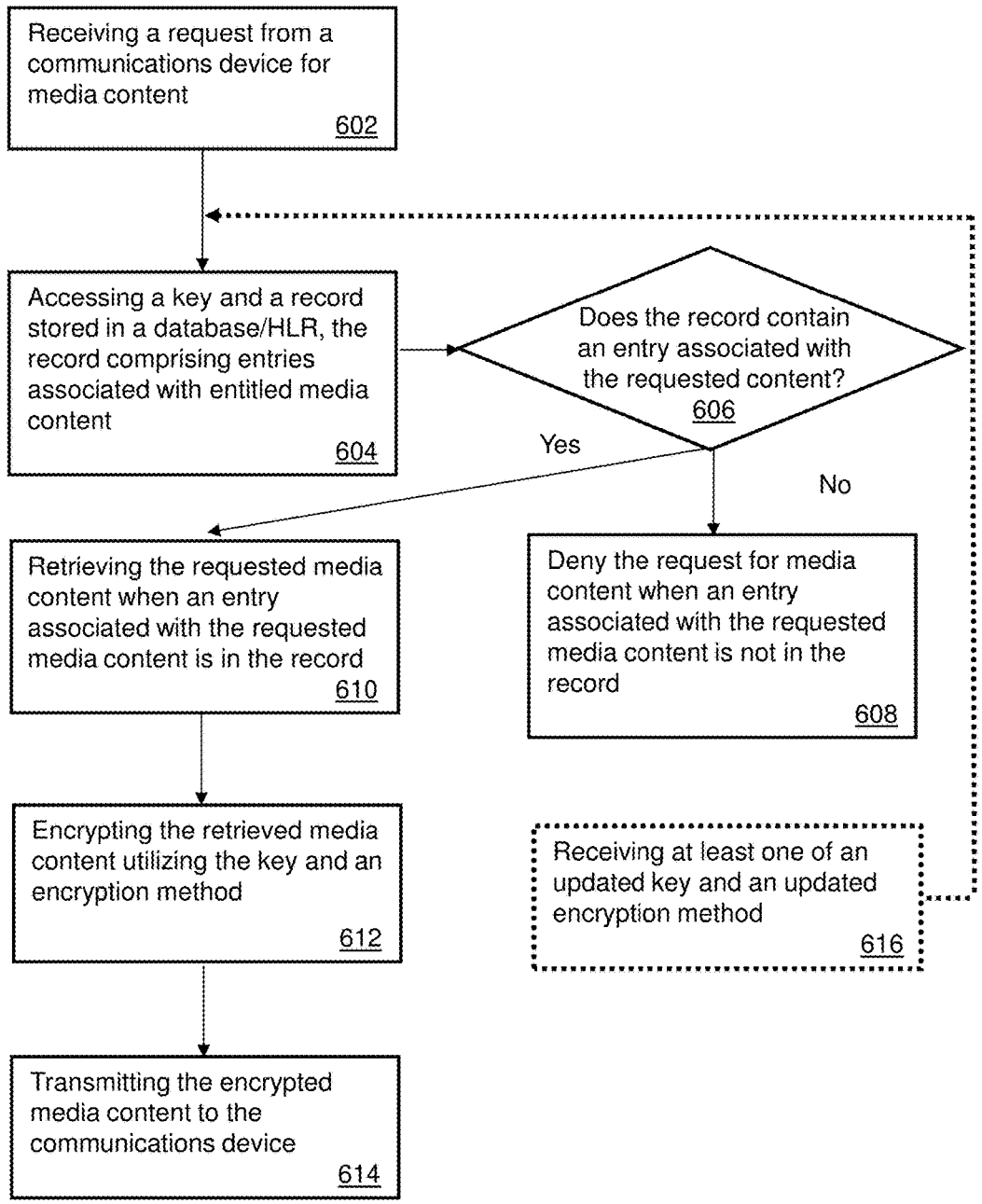
FIG. 6 depicts an illustrative embodiment of a method operating in portions of the communications systems of FIGS. 1-2 and the system of FIG. 5.

FIG. 6 depicts an illustrative method 600 that operates in portions of the communication systems of FIGS. 1-2 and the system of FIG. 5. Method 600 can begin with step 602 in which an iTV system, such as IPTV system 502, can receive a request for media content from a communications device 512 via base station 510 and gateway 506. The iTV system can include IPTV television, which can be provided by IPTV system 502, interactive cable television, and interactive satellite television. As mentioned above, the media content can include video, image, audio, text, and other content. The user, for example, can use communications device 512 to send a request for sports programming After receiving the request for media content, the gateway 506 can access and/or receive an encryption key and a record outlining the content the user is entitled to receive from the HLR 508 and/or the IPTV system 502 at step 604.

At step 606, the gateway 506 can determine if the user is authorized to receive the media content by determining if there is an entry in the record associated with the requested content. For example, the record can contain a list of entitled media content and the gateway 506 can determine if the requested media content corresponds or is associated with at least one entry in the list of entitled media content. If the gateway 506 determines that the requested media content does not have an associated entry in the record, the gateway and/or the iTV system, such as IPTV system 502, can deny the user's request for media content. Using the example above, if the record associated with the user has no entry for the requested sports programming, the gateway 506 would not transmit the sports programming to the user since the user is not entitled to the programming.

However, if the gateway 506 determines that there is an entry in the record associated with the requested media content and that the user is entitled to the content, the gateway 506 can send a signal to the IPTV system 502 to send the requested media content. At step 610, the gateway 506 can retrieve the media content from the IPTV system 502 upon determining that an entry associated with the requested media content is in the record. By allowing only entitled media content to be transmitted, the system 500 can benefit from a reduction in congestion, which can free up system/network resources. Once the gateway 506 receives the requested media content, the gateway 506 can encrypt the retrieved media content utilizing the encryption key stored on the HLR 508 at step 612. The encryption key can be a static Advanced Encryption Standard (AES) key, however, the invention is not so limited.

At step 614, the gateway 506 can transmit the encrypted media content to the communications device 512 via base station 510. Now that the communications device 512 is receiving the encrypted media content, the communications device 512 can decrypt the media content using a decryption key. The decryption key can be at least partially, if not fully, associated with the encryption key, and the decryption key can also be a static AES key, which can be used to avoid having to transmit keys back and forth through the system 500. However, the invention is not so limited. Notably, the decryption key can be stored on one or more of a Subscriber Identity Module (SIM) card associated with the communications device 512 and a memory of the communications device 512. For example, if the user is using a cellular phone, the decryption key can be stored on a storage area of the SIM card of the phone. Once the media content is decrypted, the communications device 512 can display or otherwise output the media content to the user.

In one embodiment, the method 600 can include, at step 616, receiving updated encryption/decryption keys and updated encryption methods from the system 500 and updating the keys and methods. The HLR 508 can receive an updated encrypted key and/or an updated encryption method from the IPTV system 502 and the HLR 508 can update the key and/or encryption method. Similarly, the communications device 512 can receive an updated decryption key and the update can be done via an Over the Air program of the communications device 512 or a SIM card of the communications device 512. The encryption method can also be updated within the secure area of the SIM card or other storage area of the communications devices 512 if an updated standard or method is received. Of course, other existing methods can be utilized to update the keys and encryption methods.

Upon reviewing the aforementioned embodiments, it would be evident to an artisan with ordinary skill in the art that said embodiments can be modified, reduced, or enhanced without departing from the scope and spirit of the claims described below.

For example, in another embodiment, the method 600 can include preventing transmission of the requested media content when the communications device 512 is compromised and/or cloned. The IPTV system 502 can receive a signal indicating that the user's communication device 512 has been compromised and/or cloned. Upon receiving the signal, the IPTV system 502 can notify other devices in the system 500 that the communications device 512 and/or the user associated with the communications device 512 is not entitled to receive content. For example, if a user's cellular phone is stolen, the user can notify the provider of the IPTV content and any requests coming from the stolen cellular phone are to be denied.

In yet another embodiment, the method 600 can include utilizing a unique encryption/decryption key for each communications device 512 and/or subscriber utilizing the system 500. Additionally, when a decryption key becomes corrupted and/or compromised, an updated key can be received by the communications device 512 and the updated key can replace the corrupted and/or compromised key. The corresponding encryption key stored at the HLR 508 can be updated as well.

Other suitable modifications can be applied to the present disclosure without departing from the scope of the claims below. Accordingly, the reader is directed to the claims section for a fuller understanding of the breadth and scope of the present disclosure.

Figure 7:
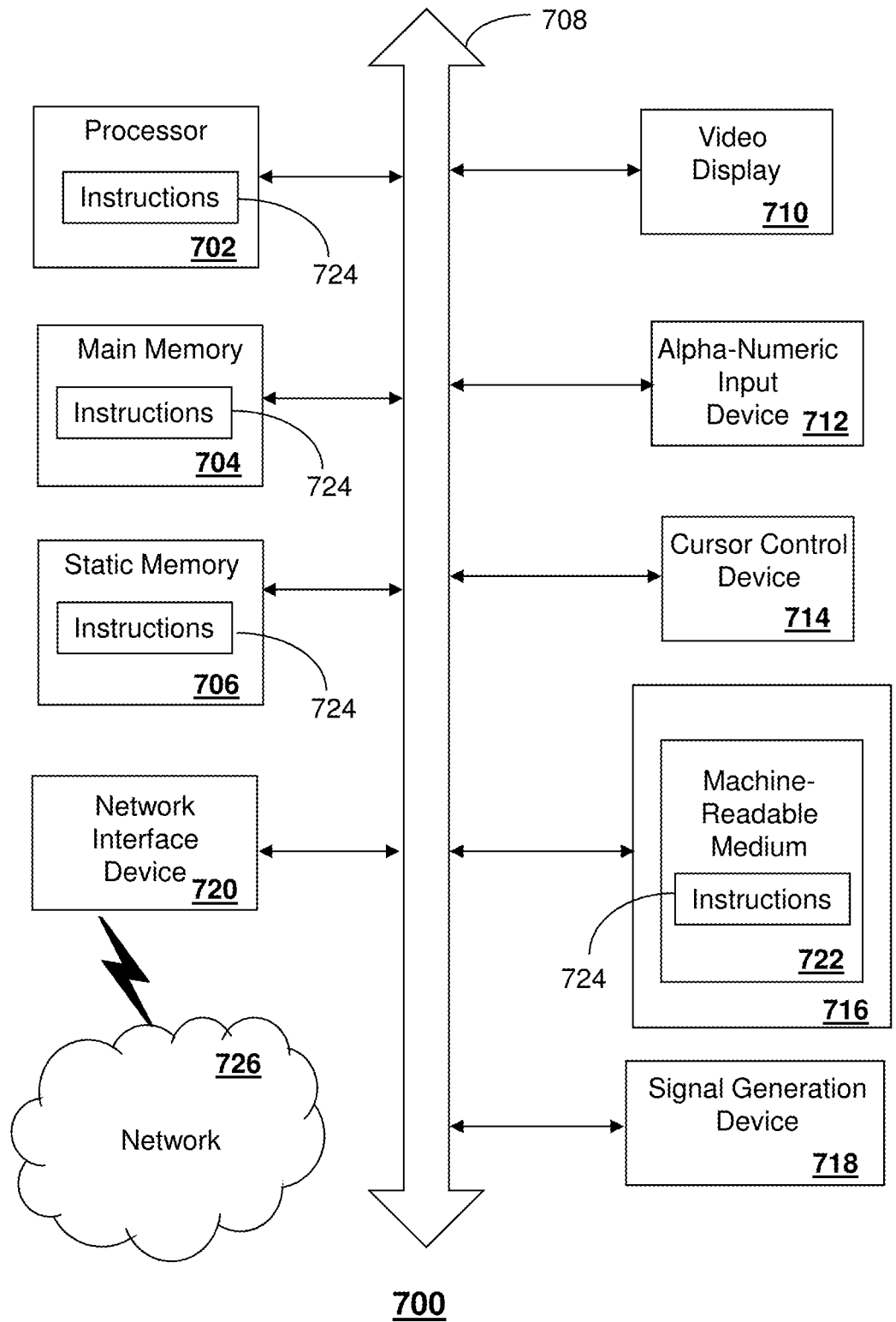
FIG. 7 is a diagrammatic representation of a machine in the form of a computer system within which a set of instructions, when executed, may cause the machine to perform any one or more of the methodologies discussed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   storing, by a home location register, subscription information about subscribers authorized to access a communication system;
   receiving, by the home location register, a query from a gateway concerning a request for requested media content from a communications device of a subscriber; and
   providing, by the home location register, an encryption key and a record comprising the subscription information to the gateway in response to the query concerning the requested media content,
      wherein the communications device does not have access to the record,
      wherein the gateway determines whether the requested media content is associated with the subscription information,
      wherein the gateway signals a content provider system to send the requested media content responsive to determining the requested media content is associated with the subscription information,
      wherein the gateway encrypts the requested media content received from the content provider system by using the encryption key to generate encrypted media content and transmits the encrypted media content to the communications device, and
      wherein encrypted media content is decrypted using a decryption key limited for use by the communications device.

2. The method of claim 1, wherein the record comprises a list of entitled media content of the subscriber and wherein the gateway determines whether the requested media content is on the list of entitled media content.

3. The method of claim 2, further comprising grouping, by the home location register, entries corresponding to the list of entitled media content based on a programming tier.

4. The method of claim 3, wherein the record comprises a programming tier to which the subscriber has subscribed, wherein the programming tier indicates whether the requested media content is on the list of entitled media content.

5. The method of claim 1, wherein the record comprises a flag indicating whether the requested media content is associated with the subscription information.

6. The method of claim 1, wherein the encrypted media content is configured for decryption based on the decryption key stored on a subscriber identity module card of the communications device.

7. The method of claim 1, wherein the requested media content is retrieved from an interactive television system.

8. The method of claim 7, wherein the interactive television system comprises internet protocol television, interactive satellite television, or interactive cable television.

9. The method of claim 1, wherein the record further comprises information indicating whether the communications device is compromised and wherein the gateway denies the request for media content when the communications device is compromised.

10. The method of claim 1, further comprising updating, by the home location register, the encryption key and an encryption method associated with the encryption key by utilizing an updated key and an updated encryption method, wherein the encrypted media content is configured for decryption by the communications device based on an updated decryption key stored on the communications device and wherein the updated decryption key is updated to correspond with the updated key and the updated encryption method.

11. The method of claim 1, further comprising storing and providing, by the home location register, routing information to the gateway.

12. A gateway, comprising:
   at least one memory to store computer instructions; and
   at least one controller coupled to the memory, wherein the at least one controller, responsive to executing the computer instructions, performs operations comprising:
      submitting to a home location register a query concerning media content requested by a communications device of a subscriber, wherein the home location register stores information about subscribers authorized to access a communication system;
      receiving from the home location register an encryption key and a list of entitled media content of the subscriber responsive to submitting the query to the home location register;
      determining whether the media content is on the list of entitled media content;
      submitting a request to a content provider system to send the media content responsive to determining that the media content is on the list of entitled media content;
      generating encrypted media content by encrypting the media content received from the content provider system using the encryption key; and
      transmitting the encrypted media content to the communications device, wherein the communications device does not have access to the list of entitled media content, and wherein media content encrypted with the encryption key is decrypted using a decryption key limited for use by the communications device.

13. The gateway of claim 12, wherein the home location register arranges entries in the list of entitled media content by groups according to a programming tier.

14. The gateway of claim 12, wherein the list of entitled media content is included in a record, and wherein the record further comprises a programming tier to which the subscriber has subscribed and the programming tier indicates whether access to the media content should be granted.

15. The gateway of claim 14, wherein the record further comprises information indicating whether the communications device is compromised, and wherein the operations further comprise denying the request for media content when the communications device is compromised.

16. The gateway of claim 12, wherein the decryption key is stored on a subscriber identity module card of the communications device.

17. The gateway of claim 12, wherein the content provider system comprises an interactive television system.

18. The gateway of claim 17, wherein the interactive television system comprises an internet protocol television system, interactive satellite television system, or an interactive cable television system.

19. A non-transitory machine-readable storage medium, comprising executable instructions that, when executed by a processor, facilitate performance of operations, comprising:

submitting to a system a query concerning media content requested by a communications device of a subscriber;

responsive to the query, receiving from the system an encryption key and a record including a list of media content items that the communications device is entitled to receive;

responsive to determining that the media content requested by the communications device is on the list of media content items, submitting a request to a content provider system to send the media content;

generating encrypted media content by encrypting the media content using the encryption key; and transmitting the encrypted media content to the communications device, wherein the communications device does not have access to the record, wherein media content encrypted with the encryption key is decrypted using a decryption key stored in a subscriber identity module card of the communications device.

20. The non-transitory machine-readable storage medium of claim 19, wherein the operations further comprise updating the encryption key and an encryption method associated with the encryption key by utilizing an updated key and an updated encryption method, and wherein the decryption key is updated to correspond with the updated key and the updated encryption method.

* * * * *